United States Patent
Finley et al.

(10) Patent No.: US 9,625,577 B1
(45) Date of Patent: *Apr. 18, 2017

(54) AVIATION DISPLAY DEPICTION OF WEATHER THREATS

(71) Applicant: Rockwell Collins, Inc., Cedar Rapids, IA (US)

(72) Inventors: Jeffery A. Finley, Cedar Rapids, IA (US); Roy E. Robertson, Marion, IA (US); Hubert C. Dyche, Spokane Valley, WA (US); Gregory J. Koenigs, Cedar Rapids, IA (US); Charles J. Dickerson, Alburnett, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/137,645

(22) Filed: Apr. 25, 2016

Related U.S. Application Data

(63) Continuation of application No. 14/681,901, filed on Apr. 8, 2015, now Pat. No. 9,322,914, which is a continuation of application No. 13/246,769, filed on Sep. 27, 2011, now Pat. No. 9,019,146.

(51) Int. Cl.
*G01S 13/95* (2006.01)
*G01S 7/06* (2006.01)
*G01S 13/89* (2006.01)

(52) U.S. Cl.
CPC ............ *G01S 13/953* (2013.01); *G01S 7/062* (2013.01); *G01S 13/89* (2013.01); *G01S 13/95* (2013.01)

(58) Field of Classification Search
CPC ....................... G01S 7/04; G01S 13/95–13/958
See application file for complete search history.

(56) References Cited

U.S. PATENT DOCUMENTS

| | | |
|---|---|---|
| 650,275 A | 5/1900 | Reeve |
| 3,251,057 A | 5/1966 | Buehler et al. |
| 3,359,557 A | 12/1967 | Fow et al. |
| 3,404,396 A | 10/1968 | Buchler et al. |
| 3,465,339 A | 9/1969 | Marner |
| 3,491,358 A | 1/1970 | Hicks |
| 3,508,259 A | 4/1970 | Andrews |
| 3,540,829 A | 11/1970 | Collinson et al. |
| 3,567,915 A | 3/1971 | Altshuler et al. |
| 3,646,555 A | 2/1972 | Atlas |
| 3,715,748 A | 2/1973 | Hicks |
| 3,764,719 A | 10/1973 | Dell |
| 3,781,530 A | 12/1973 | Britland et al. |
| 3,781,878 A | 12/1973 | Kirkpatrick |

(Continued)

FOREIGN PATENT DOCUMENTS

| | | |
|---|---|---|
| EP | 1 329 738 B1 | 7/2003 |
| FR | 2658617 A1 | 8/1991 |
| WO | WO-98/07047 A1 | 2/1998 |
| WO | WO-98/22834 A1 | 5/1998 |
| WO | WO-03/005060 A1 | 1/2003 |
| WO | WO-2009/137158 | 11/2009 |

OTHER PUBLICATIONS

U.S. Appl. No. 12/075,103, filed Mar. 7, 2008, Woodell et al.

(Continued)

*Primary Examiner* — Peter Bythrow
(74) *Attorney, Agent, or Firm* — Donna P. Suchy; Daniel M. Barbieri

(57) ABSTRACT

A method for indicating a weather threat to an aircraft is provided. The method includes inferring a weather threat to an aircraft and causing an image to be displayed on an aviation display in response to a determination by aircraft processing electronics that the inferred weather threat to the aircraft is greater than a measured weather threat to the aircraft.

20 Claims, 8 Drawing Sheets

(56) References Cited

U.S. PATENT DOCUMENTS

| | | | |
|---|---|---|---|
| 3,803,609 A | 4/1974 | Lewis et al. | |
| 3,885,237 A | 5/1975 | Kirkpatrick | |
| 3,943,511 A | 3/1976 | Evans et al. | |
| 3,964,064 A | 6/1976 | Brandao et al. | |
| 3,968,490 A | 7/1976 | Gostin | |
| 4,015,257 A | 3/1977 | Fetter | |
| 4,043,194 A | 8/1977 | Tanner | |
| 4,223,309 A | 9/1980 | Payne | |
| 4,283,715 A | 8/1981 | Choisnet | |
| 4,283,725 A | 8/1981 | Chisholm | |
| 4,318,100 A | 3/1982 | Shimizu et al. | |
| 4,346,595 A | 8/1982 | Frosch et al. | |
| 4,430,654 A | 2/1984 | Kupfer | |
| 4,435,707 A | 3/1984 | Clark | |
| 4,459,592 A | 7/1984 | Long | |
| 4,533,915 A | 8/1985 | Lucchi et al. | |
| 4,555,703 A | 11/1985 | Cantrell | |
| 4,600,925 A | 7/1986 | Alitz et al. | |
| 4,613,938 A * | 9/1986 | Hansen | G01N 15/0227 250/574 |
| 4,649,388 A | 3/1987 | Atlas | |
| 4,658,255 A | 4/1987 | Nakamura et al. | |
| 4,684,950 A | 8/1987 | Long | |
| 4,742,353 A | 5/1988 | D'Addio et al. | |
| 4,761,650 A | 8/1988 | Masuda et al. | |
| 4,835,536 A | 5/1989 | Piesinger et al. | |
| RE33,152 E | 1/1990 | Atlas | |
| 4,914,444 A | 4/1990 | Pifer et al. | |
| 4,928,131 A | 5/1990 | Onozawa | |
| 4,940,987 A | 7/1990 | Frederick | |
| 5,036,334 A | 7/1991 | Henderson et al. | |
| 5,049,886 A | 9/1991 | Seitz et al. | |
| 5,057,820 A | 10/1991 | Markson et al. | |
| 5,077,558 A * | 12/1991 | Kuntman | G01S 13/953 342/26 B |
| 5,105,191 A | 4/1992 | Keedy | |
| 5,159,407 A | 10/1992 | Churnside et al. | |
| 5,164,731 A | 11/1992 | Borden et al. | |
| 5,173,704 A | 12/1992 | Buehler et al. | |
| 5,177,487 A | 1/1993 | Taylor et al. | |
| 5,198,819 A * | 3/1993 | Susnjara | G01S 13/953 342/180 |
| 5,202,690 A | 4/1993 | Frederick | |
| 5,208,600 A | 5/1993 | Rubin | |
| 5,221,924 A | 6/1993 | Wilson, Jr. | |
| 5,262,773 A | 11/1993 | Gordon | |
| 5,291,208 A | 3/1994 | Young | |
| 5,296,865 A | 3/1994 | Lewis | |
| 5,311,183 A * | 5/1994 | Mathews | G01S 13/953 342/26 B |
| 5,311,184 A | 5/1994 | Kuntman | |
| 5,331,330 A | 7/1994 | Susnjara | |
| 5,396,220 A | 3/1995 | Markson et al. | |
| 5,402,116 A | 3/1995 | Ashley | |
| 5,469,168 A | 11/1995 | Anderson | |
| 5,479,173 A | 12/1995 | Yoshioka et al. | |
| 5,485,157 A | 1/1996 | Long | |
| 5,517,193 A | 5/1996 | Allison et al. | |
| 5,521,603 A | 5/1996 | Young | |
| 5,534,868 A | 7/1996 | Gjessing et al. | |
| 5,568,151 A | 10/1996 | Merritt | |
| 5,583,972 A | 12/1996 | Miller | |
| 5,592,171 A | 1/1997 | Jordan | |
| 5,602,543 A | 2/1997 | Prata et al. | |
| 5,615,118 A | 3/1997 | Frank | |
| 5,648,782 A | 7/1997 | Albo et al. | |
| 5,654,700 A | 8/1997 | Prata et al. | |
| 5,657,009 A | 8/1997 | Gordon | |
| 5,686,919 A | 11/1997 | Jordan et al. | |
| 5,726,656 A | 3/1998 | Frankot | |
| 5,757,322 A | 5/1998 | Ray et al. | |
| 5,771,020 A | 6/1998 | Markson et al. | |
| 5,828,332 A | 10/1998 | Frederick | |
| 5,838,239 A | 11/1998 | Stern et al. | |
| 5,839,080 A | 11/1998 | Muller et al. | |
| 5,907,568 A | 5/1999 | Reitan, Jr. | |
| 5,920,276 A | 7/1999 | Frederick | |
| 5,945,926 A | 8/1999 | Ammar et al. | |
| 5,973,635 A | 10/1999 | Albo | |
| 6,034,760 A | 3/2000 | Rees | |
| 6,043,756 A | 3/2000 | Bateman et al. | |
| 6,043,757 A * | 3/2000 | Patrick | G08G 5/0095 340/945 |
| 6,081,220 A | 6/2000 | Fujisaka et al. | |
| 6,138,060 A | 10/2000 | Conner et al. | |
| 6,154,151 A | 11/2000 | McElreath et al. | |
| 6,154,169 A | 11/2000 | Kuntman | |
| 6,177,873 B1 | 1/2001 | Cragun | |
| 6,184,816 B1 | 2/2001 | Zheng et al. | |
| 6,201,494 B1 | 3/2001 | Kronfeld | |
| 6,208,284 B1 | 3/2001 | Woodell et al. | |
| 6,236,351 B1 | 5/2001 | Conner et al. | |
| 6,240,369 B1 | 5/2001 | Foust | |
| 6,246,367 B1 | 6/2001 | Markson et al. | |
| 6,281,832 B1 | 8/2001 | McElreath | |
| 6,289,277 B1 | 9/2001 | Feyereisen et al. | |
| 6,297,772 B1 | 10/2001 | Lewis | |
| 6,339,747 B1 | 1/2002 | Daly et al. | |
| 6,340,946 B1 | 1/2002 | Wolfson et al. | |
| 6,377,202 B1 | 4/2002 | Kropfli et al. | |
| 6,381,538 B1 | 4/2002 | Robinson et al. | |
| 6,388,607 B1 | 5/2002 | Woodell | |
| 6,388,608 B1 * | 5/2002 | Woodell | G01S 13/95 342/192 |
| RE37,725 E | 6/2002 | Yamada | |
| 6,405,134 B1 * | 6/2002 | Smith | G01S 13/951 702/4 |
| 6,424,288 B1 | 7/2002 | Woodell | |
| 6,441,773 B1 | 8/2002 | Kelly et al. | |
| 6,456,226 B1 | 9/2002 | Zheng et al. | |
| 6,480,142 B1 | 11/2002 | Rubin | |
| 6,496,252 B1 | 12/2002 | Whiteley | |
| 6,501,392 B2 | 12/2002 | Gremmert et al. | |
| 6,512,476 B1 | 1/2003 | Woodell | |
| 6,518,914 B1 | 2/2003 | Peterson et al. | |
| 6,549,161 B1 | 4/2003 | Woodell | |
| 6,560,538 B2 | 5/2003 | Schwinn et al. | |
| 6,563,452 B1 | 5/2003 | Zheng et al. | |
| 6,577,947 B1 | 6/2003 | Kronfeld et al. | |
| 6,590,520 B1 | 7/2003 | Steele et al. | |
| 6,597,305 B2 | 7/2003 | Szeto et al. | |
| 6,603,425 B1 | 8/2003 | Woodell | |
| 6,606,564 B2 | 8/2003 | Schwinn et al. | |
| 6,614,382 B1 | 9/2003 | Cannaday et al. | |
| 6,650,275 B1 * | 11/2003 | Kelly | G01S 7/22 342/175 |
| 6,650,972 B1 * | 11/2003 | Robinson | G01C 23/00 701/14 |
| 6,667,710 B2 | 12/2003 | Cornell et al. | |
| 6,670,908 B2 * | 12/2003 | Wilson | G01S 13/951 342/176 |
| 6,677,886 B1 | 1/2004 | Lok | |
| 6,683,609 B1 | 1/2004 | Baron et al. | |
| 6,690,317 B2 | 2/2004 | Szeto et al. | |
| 6,703,945 B2 | 3/2004 | Kuntman et al. | |
| 6,720,906 B2 | 4/2004 | Szeto et al. | |
| 6,738,010 B2 | 5/2004 | Steele et al. | |
| 6,741,203 B1 * | 5/2004 | Woodell | G01S 5/02 342/120 |
| 6,744,382 B1 | 6/2004 | Lapis et al. | |
| 6,771,207 B1 | 8/2004 | Lang | |
| 6,788,043 B2 | 9/2004 | Murphy et al. | |
| 6,791,311 B2 | 9/2004 | Murphy et al. | |
| 6,828,922 B1 | 12/2004 | Gremmert et al. | |
| 6,828,923 B2 | 12/2004 | Anderson | |
| 6,839,018 B2 | 1/2005 | Szeto et al. | |
| 6,850,185 B1 | 2/2005 | Woodell | |
| 6,856,908 B2 | 2/2005 | Devarasetty et al. | |
| 6,879,280 B1 * | 4/2005 | Bull | G01S 7/18 342/175 |
| 6,882,302 B1 * | 4/2005 | Woodell | G01S 7/062 342/179 |
| 6,917,860 B1 | 7/2005 | Robinson et al. | |

(56) References Cited

U.S. PATENT DOCUMENTS

| | | | |
|---|---|---|---|
| 6,977,608 B1 | 12/2005 | Anderson et al. | |
| 7,030,805 B2 | 4/2006 | Ormesher et al. | |
| 7,042,387 B2* | 5/2006 | Ridenour | G08G 5/0013 342/179 |
| 7,082,382 B1 | 7/2006 | Rose et al. | |
| 7,109,912 B1 | 9/2006 | Paramore et al. | |
| 7,109,913 B1* | 9/2006 | Paramore | G01C 23/00 342/176 |
| 7,116,266 B1 | 10/2006 | Vesel et al. | |
| 7,129,885 B1* | 10/2006 | Woodell | G01S 7/2813 342/159 |
| 7,132,974 B1 | 11/2006 | Christianson | |
| 7,139,664 B2 | 11/2006 | Kelly et al. | |
| 7,145,503 B2 | 12/2006 | Abramovich et al. | |
| 7,161,525 B1* | 1/2007 | Finley | G01S 7/062 342/179 |
| 7,200,491 B1 | 4/2007 | Rose et al. | |
| 7,205,928 B1 | 4/2007 | Sweet | |
| 7,242,343 B1* | 7/2007 | Woodell | G01S 7/41 342/26 B |
| 7,259,714 B1 | 8/2007 | Cataldo | |
| 7,292,178 B1* | 11/2007 | Woodell | G01S 7/04 342/104 |
| 7,307,576 B1* | 12/2007 | Koenigs | G01S 13/953 342/26 B |
| 7,307,577 B1 | 12/2007 | Kronfeld et al. | |
| 7,307,583 B1* | 12/2007 | Woodell | G01S 7/4026 342/173 |
| 7,307,586 B2 | 12/2007 | Peshlov et al. | |
| 7,307,756 B2 | 12/2007 | Walmsley | |
| 7,352,317 B1 | 4/2008 | Finley et al. | |
| 7,352,929 B2 | 4/2008 | Hagen et al. | |
| 7,365,674 B2 | 4/2008 | Tillotson et al. | |
| 7,372,394 B1 | 5/2008 | Woodell et al. | |
| 7,383,131 B1 | 6/2008 | Wey et al. | |
| 7,417,578 B1 | 8/2008 | Woodell et al. | |
| 7,417,579 B1* | 8/2008 | Woodell | G01S 13/953 342/159 |
| 7,427,943 B1 | 9/2008 | Kronfeld et al. | |
| 7,436,361 B1 | 10/2008 | Paulsen et al. | |
| 7,471,995 B1 | 12/2008 | Robinson | |
| 7,486,219 B1* | 2/2009 | Woodell | G01S 7/003 342/159 |
| 7,486,220 B1* | 2/2009 | Kronfeld | G01S 13/953 342/26 B |
| 7,492,304 B1 | 2/2009 | Woodell et al. | |
| 7,492,305 B1* | 2/2009 | Woodell | G01S 7/064 342/26 A |
| 7,515,087 B1* | 4/2009 | Woodell | G01S 7/22 342/175 |
| 7,515,088 B1* | 4/2009 | Woodell | G01S 7/003 342/175 |
| 7,528,613 B1 | 5/2009 | Thompson et al. | |
| 7,541,971 B1 | 6/2009 | Woodell et al. | |
| 7,557,735 B1* | 7/2009 | Woodell | G01S 13/953 340/649 |
| 7,576,680 B1 | 8/2009 | Woodell | |
| 7,581,441 B2 | 9/2009 | Barny et al. | |
| 7,598,901 B2 | 10/2009 | Tillotson et al. | |
| 7,598,902 B1 | 10/2009 | Woodell et al. | |
| 7,633,428 B1 | 12/2009 | McCusker et al. | |
| 7,633,431 B1 | 12/2009 | Wey et al. | |
| 7,664,601 B2* | 2/2010 | Daly, Jr. | G01S 13/723 342/26 B |
| 7,696,921 B1* | 4/2010 | Finley | G01S 7/062 342/26 B |
| 7,714,767 B1 | 5/2010 | Kronfeld et al. | |
| 7,728,758 B2 | 6/2010 | Varadarajan et al. | |
| 7,733,264 B1* | 6/2010 | Woodell | G01S 13/953 342/175 |
| 7,859,448 B1 | 12/2010 | Woodell et al. | |
| 7,868,811 B1* | 1/2011 | Woodell | G01S 7/22 342/175 |
| 7,917,255 B1* | 3/2011 | Finley | G01S 13/953 340/945 |
| 7,932,853 B1 | 4/2011 | Woodell et al. | |
| 7,973,698 B1 | 7/2011 | Woodell et al. | |
| 7,982,658 B2* | 7/2011 | Kauffman | G01S 13/953 342/26 B |
| 8,022,859 B2 | 9/2011 | Bunch et al. | |
| 8,054,214 B2 | 11/2011 | Bunch | |
| 8,072,368 B1 | 12/2011 | Woodell | |
| 8,081,106 B2 | 12/2011 | Yannone | |
| 8,089,391 B1* | 1/2012 | Woodell | G01S 7/22 342/175 |
| 8,098,188 B2 | 1/2012 | Costes et al. | |
| 8,098,189 B1 | 1/2012 | Woodell et al. | |
| 8,111,186 B2* | 2/2012 | Bunch | G01W 1/10 342/26 B |
| 8,159,369 B1* | 4/2012 | Koenigs | G01S 7/062 340/963 |
| 8,217,828 B2 | 7/2012 | Kirk | |
| 8,228,227 B2* | 7/2012 | Bunch | G01S 7/04 342/180 |
| 8,314,730 B1 | 11/2012 | Musiak et al. | |
| 8,332,084 B1 | 12/2012 | Bailey et al. | |
| 8,601,864 B1 | 12/2013 | Eilts et al. | |
| 8,902,100 B1 | 12/2014 | Woodell et al. | |
| 9,019,146 B1 | 4/2015 | Finley et al. | |
| 9,134,418 B1 | 9/2015 | Kronfeld et al. | |
| 2002/0039072 A1 | 4/2002 | Gremmert et al. | |
| 2002/0126039 A1 | 9/2002 | Dalton et al. | |
| 2003/0001770 A1 | 1/2003 | Cornell et al. | |
| 2003/0025627 A1 | 2/2003 | Wilson et al. | |
| 2003/0117311 A1 | 6/2003 | Funai | |
| 2003/0193411 A1 | 10/2003 | Price | |
| 2004/0183695 A1 | 9/2004 | Ruokangas et al. | |
| 2004/0239550 A1 | 12/2004 | Daly, Jr. | |
| 2005/0049789 A1 | 3/2005 | Kelly et al. | |
| 2005/0174350 A1 | 8/2005 | Ridenour et al. | |
| 2006/0036366 A1 | 2/2006 | Kelly et al. | |
| 2007/0005249 A1 | 1/2007 | Dupree et al. | |
| 2007/0152867 A1 | 7/2007 | Randall | |
| 2008/0158049 A1 | 7/2008 | Southard et al. | |
| 2009/0177343 A1 | 7/2009 | Bunch et al. | |
| 2009/0219197 A1 | 9/2009 | Bunch | |
| 2010/0019938 A1 | 1/2010 | Bunch | |
| 2010/0042275 A1 | 2/2010 | Kirk | |
| 2010/0110431 A1 | 5/2010 | Ray et al. | |
| 2010/0194628 A1 | 8/2010 | Christianson et al. | |
| 2010/0201565 A1* | 8/2010 | Khatwa | G01S 7/062 342/26 B |
| 2010/0245164 A1 | 9/2010 | Kauffman | |
| 2010/0245165 A1 | 9/2010 | Kauffman et al. | |
| 2010/0302094 A1 | 12/2010 | Bunch et al. | |
| 2011/0074624 A1 | 3/2011 | Bunch | |
| 2011/0148692 A1 | 6/2011 | Christianson | |
| 2011/0148694 A1* | 6/2011 | Bunch | G01S 13/953 342/26 B |
| 2011/0187588 A1 | 8/2011 | Khatwa et al. | |
| 2012/0029786 A1 | 2/2012 | Calandra et al. | |
| 2012/0133551 A1 | 5/2012 | Pujol et al. | |
| 2012/0139778 A1 | 6/2012 | Bunch et al. | |
| 2013/0226452 A1 | 8/2013 | Watts | |
| 2013/0234884 A1 | 9/2013 | Bunch et al. | |
| 2014/0039734 A1 | 2/2014 | Ramaiah et al. | |
| 2014/0176362 A1 | 6/2014 | Sneed | |
| 2014/0362088 A1 | 12/2014 | Veillette et al. | |

OTHER PUBLICATIONS

U.S. Appl. No. 13/246,769, filed Sep. 27, 2011, Rockwell Collins.
U.S. Appl. No. 13/841,893, filed Mar. 15, 2013, Rockwell Collins, Inc.
U.S. Appl. No. 13/919,406, filed Jun. 17, 2013, Rockwell Collins, Inc.
U.S. Appl. No. 14/086,844, filed Nov. 21, 2013, Rockwell Collins, Inc.
U.S. Appl. No. 14/206,651, filed Mar. 12, 2014, Rockwell Collins, Inc.

(56) References Cited

OTHER PUBLICATIONS

U.S. Appl. No. 14/207,034, filed Mar. 12, 2014, Rockwell Collins, Inc.
3-D Weather Hazard and Avoidance System, Honeywell InteVue Brochure dated Nov. 2008, 4 pages.
Advisory Action for U.S. Appl. No. 12/075,103, mail date Feb. 13, 2013, 3 pages.
Advisory Action for U.S. Appl. No. 12/075,103, mail date Nov. 8, 2010, 3 pages.
Advisory Action for U.S. Appl. No. 12/075,103, mail date Oct. 15, 2010, 3 pages.
Bovith et al., Detecting Weather Radar Clutter by Information Fusion with Satellite Images and Numerical Weather Prediction Model Output; Jul. 31-Aug. 4, 2006, 4 pages.
Burnham et al., Thunderstorm Turbulence and Its Relationship to Weather Radar Echoes, J. Aircraft, Sep.-Oct. 1969, 8 pages.
Corridor Integrated Weather System (CIWS), www.11.mit.edu/mission/aviation/faawxsystems/ciws.html, received on Aug. 19, 2009, 3 pages.
Decision on Appeal for Inter Parties Reexamination Control No. 95/001,860, dated Oct. 17, 2014, 17 pages.
Doviak et al., Doppler Radar and Weather Observations, 1984, 298 pages.
Doviak et al., Doppler Radar and Weather Observations, 1984, 298 pages. (Uploaded in two parts).
Dupree et al.,FAA Tactical Weather Forecasting in the United States National Airspace, Proceedings from the World Weather Research Symposium on Nowcasting and Very Short Term Forecasts, Toulouse, France, 2005, 29 pages.
Final Office Action on U.S. Appl. No. 12,892,663 dated Mar. 7, 2013, 13 pages.
Final Office Action on U.S. Appl. No. 13/238,606 Dated Apr. 1, 2014, 11 pages.
Final Office Action on U.S. Appl. No. 13/246,769 Dated Sep. 16, 2014, 18 pages.
Goodman et al., LISDAD Lightning Observations during the Feb. 22-23, 1998 Central Florida Tornado Outbreak, http:www.srh.noaa.gov/topics/attach/html/ssd98-37.htm, Jun. 1, 1998, 5 pages.
Greene et al., Vertically Integrated Liquid Water-A New Analysis Tool, Monthly Weather Review, Jul. 1972, 5 pages.
Hodanish, Integration of Lightning Detection Systems in a Modernized National Weather Service Office, http://www.srh.noaa.gov/mlb/hoepub.html, retrieved on Aug. 6, 2007, 5 pages.
Honeywell, RDR-4B Forward Looking Windshear Detection/Weather Radar System User's Manual with Radar Operation Guidelines, Jul. 2003.
Keith, Transport Category Airplane Electronic Display Systems, Jul. 16, 1987, 34 pages.
Klingle-Wilson et al., Description of Corridor Integrated Weather System (CIWS) Weather Products, Aug. 1, 2005, 120 pages.
Kuntman et al, Turbulence Detection and Avoidance System, Flight Safety Foundation 53rd International Air Safety Seminar (IASS), Oct. 29, 2000.
Kuntman, Airborne System to Address Leading Cause of Injuries in Non-Fatal Airline Accidents, ICAO Journal, Mar. 2000.
Kuntman, Satellite Imagery: Predicting Aviation Weather Hazards, ICAO Journal, Mar. 2000, 4 pps.
Meteorological/KSC/L71557/Lighting Detection and Ranging (LDAR), Jan. 2002, 12 pages.
Nathanson, Fred E., "Radar and Its Composite Environment," Radar Design Principles, Signal Processing and the Environment, 1969, 5 pages, McGraw-Hill Book Company, New York et al.
Non-Final Office Action on U.S. Appl. No. 14/452,235 Dated Apr. 23, 2015, 9 pages.
Non-Final Office Action on U.S. Appl. No. 12/892,663 Dated May 29, 2013, 14 pages.
Non-Final Office Action on U.S. Appl. No. 13/238,606 Dated Jul. 8, 2014, 12 pages.
Non-Final Office Action on U.S. Appl. No. 13/238,606 Dated Sep. 23, 2013, 15 pages.
Non-Final Office Action on U.S. Appl. No. 13/717,052 Dated Feb. 11, 2015, 15 pages.
Non-Final Office Action on U.S. Appl. No. 13/717,052 Dated Sep. 9, 2014, 8 pages.
Non-Final Office Action on U.S. Appl. No. 13/841,893 Dated Jun. 22, 2015, 27 pages.
Non-Final Office Action on U.S. Appl. No. 13/919,406 Dated Jul. 14, 2015, 23 pages.
Notice of Allowance for U.S. Appl. No. 10/631,253, mail date Jul. 28, 2005, 7 pages.
Notice of Allowance for U.S. Appl. No. 11/256,845, mail date May 27, 2009, 7 pages.
Notice of Allowance for U.S. Appl. No. 11/370,085, mail date Dec. 30, 2008, 6 pages.
Notice of Allowance for U.S. Appl. No. 11/402,434, mail date Nov. 4, 2008, 6 pages.
Notice of Allowance for U.S. Appl. No. 12/474,102, mail date Jan. 20, 2012, 6 pages.
Notice of Allowance on U.S. Appl. No. 12/075,103 Dated Aug. 4, 2014, 10 pages.
Notice of Allowance on U.S. Appl. No. 13/246,769 Dated Jan. 8, 2015, 10 pages.
Notice of Allowance on U.S. Appl. No. 13/707,438 Dated Feb. 25, 2015, 11 pages.
Office Action for U.S. Appl. No. 11/256,845, mail date Aug. 21, 2007, 4 pages.
Office Action for U.S. Appl. No. 10/631,253, mail date Jan. 14, 2004, 5 pages.
Office Action for U.S. Appl. No. 10/631,253, mail date Jun. 30, 2004, 4 pages.
Office Action for U.S. Appl. No. 11/256,845, mail date Dec. 5, 2006, 5 pages.
Office Action for U.S. Appl. No. 11/256,845, mail date Jul. 28, 2008, 5 pages.
Office Action for U.S. Appl. No. 11/256,845, mail date Jun. 22, 2006, 5 pages.
Office Action for U.S. Appl. No. 11/370,085, mail date Aug. 15, 2007, 10 pages.
Office Action for U.S. Appl. No. 11/370,085, mail date Dec. 4, 2007, 13 pages.
Office Action for U.S. Appl. No. 11/370,085, mail date Oct. 9, 2008, 5 pages.
Office Action for U.S. Appl. No. 11/402,434, mail date Jul. 17, 2008, 5 pages.
Office Action for U.S. Appl. No. 11/402,434, mail date Mar. 29, 2007, 8 pages.
Office Action for U.S. Appl. No. 11/402,434, mail date Oct. 26, 2006, 7 pages.
Office Action for U.S. Appl. No. 11/402,434, mail date Sep. 20, 2007, 7 pages.
Office Action for U.S. Appl. No. 12/075,103, mail date Feb. 26, 2010, 11 pages.
Office Action for U.S. Appl. No. 12/075,103, mail date Jul. 29, 2010, 7 pages.
Office Action for U.S. Appl. No. 12/075,103, mail date Jun. 20, 2012, 5 pages.
Office Action for U.S. Appl. No. 12/075,103, mail date Nov. 29, 2012, 6 pages.
Office Action for U.S. Appl. No. 12/474,102, mail date Sep. 7, 2011, 8 pages.
Office Action for U.S. Appl. No. 12/892,663, mail date Oct. 22, 2012, 12 pages.
Office Action for U.S. Appl. No. 13/717,052, mail date Aug. 22, 2013, 15 pages.
Office Action on U.S. Appl. No. 12/075,103 Dated Apr. 9, 2014, 5 pages.
Office Action on U.S. Appl. No. 12/075,103 Dated Jul. 31, 2013, 8 pages.
Office Action on U.S. Appl. No. 13/246,769 Dated Apr. 21, 2014, 18 pages.
Office Action on U.S. Appl. No. 13/717,052 Dated Dec. 23, 2013, 7 pages.

(56) References Cited

OTHER PUBLICATIONS

Pessi et al., On the Relationship Between Lightning and Convective Rainfall Over the Central Pacific Ocean, date unknown, 9 pages.
RDR-4B Honeywell User Manual for Forward Looking Windshear Detection/Weather Radar System, Rev. 6, Jul. 2003, 106 pps.
Robinson et al., En Route Weather Depiction Benefits of the Nexrad Vertically Integrated Liquid Water Product Utilized by the Corridor Integrated Weather System, 10th Conference on Aviation, Range, and Aerospace Meteorology (ARAM), 2002, 4 pages.
Stormscope Lightning Detection Systems, L3 Avionics Systems, retrieved on Jul. 11, 2011, 6 pages.
TOA Technology, printed from website: http://www.toasystems.com/technology.html on Dec. 29, 2010, 2 pages.
Triangulation, from Wikipedia, printed from website: http://en.wikipedia.org/wiki/Triangulation on Dec. 29, 2010, 6 pages.
US Office Action on U.S. Appl. No. 13/717,052 Dated Mar. 27, 2014, 6 pages.
Waldvogel et al., The Kinetic Energy of Hailfalls. Part I: Hailstone Spectra, Journal of Applied Meteorology, Apr. 1978, 8 pages.
Wilson et al., The Complementary Use of Titan-Derived Radar and Total Lightning Thunderstorm Cells, paper presented on Oct. 16, 2005, 10 pages.
Zipser et al., The Vertical Profile of Radar Reflectivity and Convective Cells: A Strong Indicator of Storm Intensity and Lightning Probability? America Meteorological Society, 1994, 9 pages.
U.S. Appl. No. 13/717,052, filed Dec. 17, 2012, Woodell et al.
U.S. Appl. No. 14/162,035, filed Jan. 23, 2014, Kevin M. Kronfeld et al.
U.S. Appl. No. 14/206,239, filed Mar. 12, 2014, Rockwell Collins.
U.S. Appl. No. 14/323,766, filed Jul. 3, 2014, Weichbrod et al.
U.S. Appl. No. 14/465,730, filed Aug. 21, 2014, Breiholz et al.
U.S. Appl. No. 14/465,753, filed Aug. 21, 2014, Arlen E. Breiholz et al.
U.S. Appl. No. 14/608,071, filed Jan. 28, 2015, Breiholz et al.
Amburn et al., 1997, VIL Density as a Hail Indicator, Wea. Forecasting, 12, 473-478.
Boudevillain et al., 2003, Assessment of Vertically Integrated Liquid (VIL) Water Content Radar Measurement, J. Atmos. Oceanic Technol., 20, 807-819.
Corrected Notice of Allowance received in U.S. Appl. No. 14/681,901 Dated Feb. 23, 2016, 2 pages.
Final Office Action on U.S. Appl. No. 13/238,606 Dated Jan. 22, 2015, 6 pages.
Lahiff, 2005, Vertically Integrated Liquid Density and Its Associated Hail Size Range Across the Burlington, Vermont County Warning Area, Eastern Regional Technical Attachment, No. 05-01, 20 pages.
Liu, Chuntao et al., Relationships between lightning flash rates and radar reflectivity vertical structures in thunderstorms over the tropics and subtropics, Journal of Geophysical Research, vol. 177, D06212, doi:10.1029/2011JDo17123,2012, American Geophysical Union, Mar. 27, 2012, 19 pages.
Non-Final Office Action on U.S. Appl. No. 13/238,606 Dated May 27, 2015, 14 pages.
Non-Final Office Action on U.S. Appl. No. 14/681,901 Dated Jun. 17, 2015, 21 pages.
Non-Final Office Action on U.S. Appl. No. 13/913,100 Dated May 4, 2015, 25 pages.
Non-Final Office Action on U.S. Appl. No. 14/162,035 dated Jul. 11, 2016, 10 pages.
Non-Final Office Action on U.S. Appl. No. 14/162,035, dated Feb. 4, 2016, 9 pages.
Non-Final Office Action on U.S. Appl. No. 14/206,239 dated Jun. 16, 2016, 12 pages.
Non-Final Office Action on U.S. Appl. No. 14/206,651 dated Jun. 23, 2016, 12 pages.
Non-Final Office Action on U.S. Appl. No. 14/207,034 dated Jun. 23, 2016, 14 pages.
Non-Final Office Action on U.S. Appl. No. 14/465,753, dated Apr. 4, 2016, 12 pages.
Non-Final Office Action on U.S. Appl. No. 14/086,844, dated Nov. 10, 2015, 17 pages.
Notice of Allowance on U.S. Appl. No. 14/086,844, dated Jun. 22, 2016, 8 pages.
Notice of Allowance on U.S. Appl. No. 14/465,753, dated Aug. 29, 2016, 8 pages.
Notice of Allowance on U.S. Appl. No. 14/681,901, dated Dec. 23, 2015, 8 pages.
Final Office Action on U.S. Appl. No. 13/717,052, dated Nov. 13, 2015, 10 pages.
Final Office Action on U.S. Appl. No. 14/206,651, dated Dec. 8, 2016, 14 pages.
Non-Final Office Action on U.S. Appl. No. 14/977,084, dated Dec. 1, 2016, 14 pages.

\* cited by examiner

US 9,625,577 B1

AVIATION DISPLAY DEPICTION OF WEATHER THREATS

CROSS-REFERENCE TO RELATED APPLICATIONS

The present application is a continuation of U.S. patent application Ser. No. 14/681,901, entitled "AVIATION DISPLAY DEPICTION OF WEATHER THREATS," filed Apr. 8, 2015, which is currently co-pending, which is a continuation of U.S. patent application Ser. No. 13/246,769, entitled "AVIATION DISPLAY DEPICTION OF WEATHER THREATS," filed Sep. 27, 2011, each of which are incorporated by reference in their entirety and for all purposes.

BACKGROUND

The present disclosure relates generally to the field of airborne radar systems. The present disclosure more specifically relates to the field of depiction of inferred weather threats on an aviation display.

In general, an airborne weather radar can readily detect precipitation (e.g., rain), which may be used as a surrogate for weather threats to an aircraft. However, some storms (e.g., typhoons) produce significant rainfall but little lightning, hail, turbulence, or other threats to the aircraft; whereas, other weather cells may produce little precipitation but severe turbulence. Similarly, lightning detectors can readily detect lightning strikes, but do not indicate areas of high electrical energy around a cell that are not active, but may be induced to strike by the passage of an aircraft.

Current systems which make inferences regarding weather threats are typically ground based and make broad predictions about weather. For example, National Weather Service severe thunderstorm watches or tornado watches indicate that conditions are favorable for a thunderstorm or tornado; however, these watches typically cover hundreds of square miles, which is generally not helpful in making decisions regarding flying through or around specific weather cells. Thus, there is a need to provide an improved system for indicating an inferred weather threat to an aircraft.

SUMMARY

One embodiment relates to a method for indicating a weather threat to an aircraft, the method including inferring a weather threat to an aircraft and causing an image to be displayed on an aviation display in response to a determination by aircraft processing electronics that the inferred weather threat to the aircraft is greater than a measured weather threat to the aircraft.

Another embodiment relates to an apparatus for indicating an inferred weather threat to an aircraft, the apparatus including processing electronics configured to cause an image to be displayed on an aviation display in response to a determination that an inferred weather threat to the aircraft is greater than a measured weather threat to the aircraft.

Another embodiment relates to an aircraft weather radar system, the system including a processing circuit configured to determine a first weather threat using an algorithm using one of 1. a wind speed, a wind direction, and a size of a weather cell, 2. a temperature and a reflectivity, 3. a temperature and a reflectivity as a function of altitude, and 4. a change in an altitude of an echo top of a weather cell over time. The processing circuit is configured to cause an image to be displayed on an aviation display in response to the first weather threat to the aircraft being greater than a measured weather threat to the aircraft.

DETAILED DESCRIPTION

Referring generally to the FIGURES, systems and methods for indicating a weather threat to an aircraft are described, according to an exemplary embodiment. An airborne weather radar system is generally configured to project radar beams and to receive radar returns relating to the projected radar beams. The projected radar beams generally pass through air and reflect off of precipitation (e.g., rain, snow, etc.), other aircraft, and terrain (e.g., a mountain, a building). Using the reflected return data, processing electronics associated with the weather radar system can distinguish between types of precipitation and terrain. Weather radar systems are typically configured to display the precipitation as measured weather threats in green (light rain), yellow (moderate rain), and red (severe rain). While this "rain gauge" provides valuable information to the crew, it is not an accurate indicator of weather threat to the aircraft. For example, tropical cyclones or typhoons produce tremendous amounts of rain, but they are generally not threatening to an aircraft because they typically do not produce turbulence, hail, or lightning.

To provide a more accurate weather threat assessment to the crew, other threats to the aircraft may be inferred. For example, a core threat assessment (e.g., the probability of hail or lightning within a weather cell) may be inferred based on reflectivity as a function of altitude. A predictive overflight threat assessment may be inferred based on the growth rate and direction of a weather cell below the aircraft. Electrified regions associated with weather cells may not contain precipitation or be actively producing lightning; however, these threatening regions may be inferred based on reflectivity and the temperature at which the reflectivity is occurring. Weather threats (e.g., turbulence, lightning, hail, etc.) associated with the blow off (e.g. anvil) region downwind of a weather cell may be inferred based on wind speed, wind direction, and size of the weather cell. The systems and methods described below cause an image to be displayed on an aviation display in response to a determination that the inferred weather threat to the aircraft is greater than the measured weather threat to the aircraft.

Figure 1:
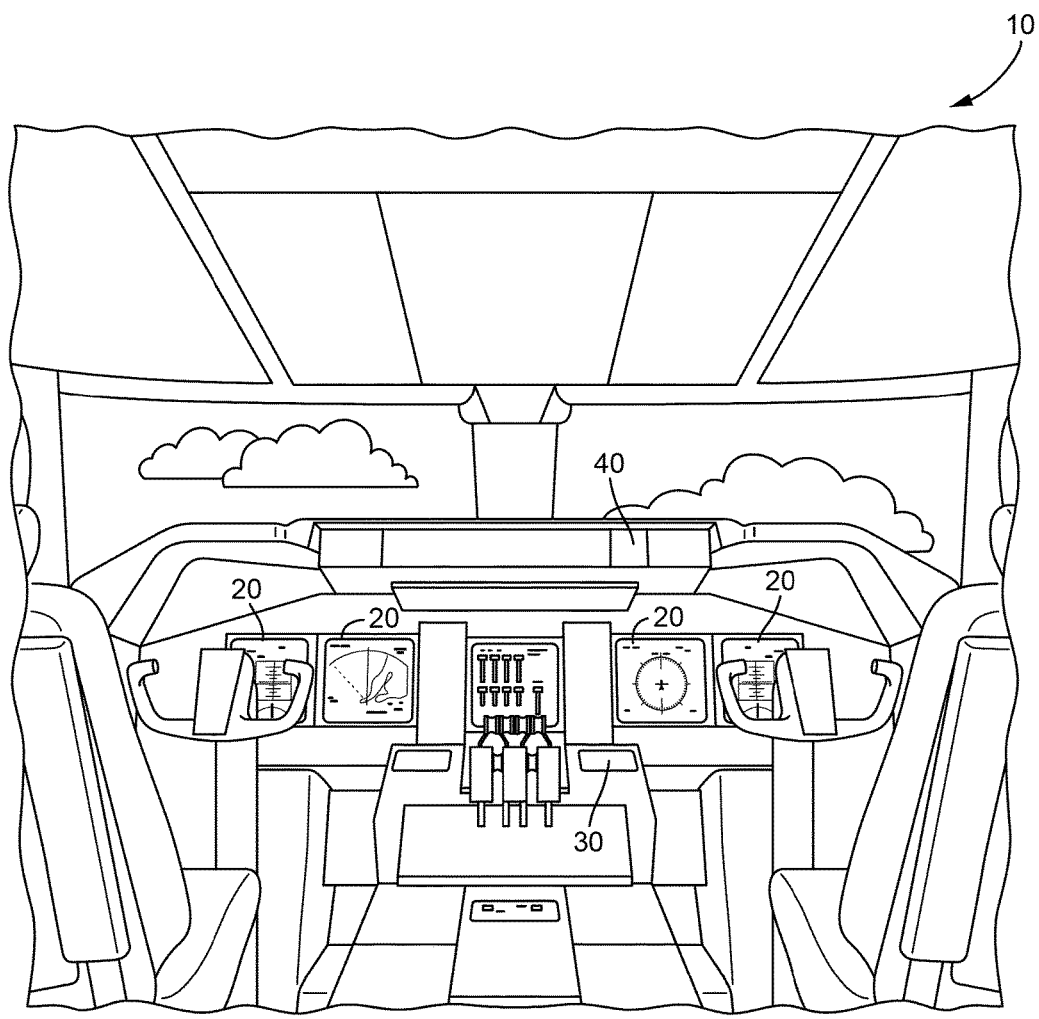
FIG. 1 is a schematic illustration of an aircraft control center, according to an exemplary embodiment.

Referring now to FIG. 1, an illustration of an aircraft control center or cockpit 10 is shown, according to an exemplary embodiment. Aircraft control center 10 includes flight displays 20 which are generally used to increase visual range and to enhance decision-making abilities. In an exemplary embodiment, flight displays 20 may provide an output from a radar system of the aircraft. For example, flight displays 20 may provide a top-down view, a horizontal view, or any other view of weather and/or terrain detected by a radar system on the aircraft. The views of weather may include monochrome or color graphical representations of the weather. Graphical representations of weather may include an indication of altitude of those objects or the altitude relative to the aircraft. Aircraft control center 10 may further include other user interface elements such as an audio device 30 (e.g., speaker, electro-acoustic transducer, etc.) and illuminating or flashing lamps 40.

Figure 2:
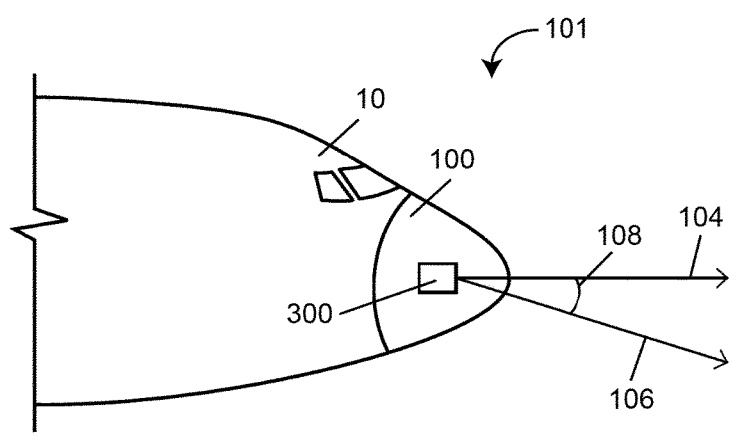
FIG. 2 is a schematic illustration of the nose of an aircraft including a weather radar system, according to an exemplary embodiment.

Referring to FIG. 2, the front of an aircraft 101 is shown with aircraft control center 10 and nose 100, according to an exemplary embodiment. A radar system 300 (e.g., a weather radar system or other radar system) is generally located within nose 100 of aircraft 101 or within aircraft control center 10 of aircraft 101. According to various exemplary embodiments, radar system 300 may be located on the top of aircraft 101 or on the tail of aircraft 101 instead. Radar system 300 may include or be coupled to an antenna system. A variety of different antennas or radar systems may be used with the present invention (e.g., a split aperture antenna, a monopulse antenna, a sequential lobbing antenna, etc.).

Radar system 300 generally works by sweeping a radar beam horizontally back and forth across the sky. Some radar systems will conduct a first horizontal sweep 104 directly in front of aircraft 101 and a second horizontal sweep 106 downward at some tilt angle 108 (e.g., 20 degrees down). Returns from different tilt angles can be electronically merged to form a composite image for display on an electronic display shown, for example, in FIG. 1. Returns can also be processed to, for example, distinguish between terrain and weather, to determine the height of terrain, or to determine the height of weather. Radar system 300 may be a WXR-2100 MultiScan™ radar system or similar system manufactured by Rockwell Collins. According to other embodiments, radar system 300 may be an RDR-4000 system or similar system manufactured by Honeywell International, Inc. Radar system 300 may include a terrain awareness and warning system (TAWS) and coordinate with associated user interface elements in aircraft control center 10 (e.g., flashing lights 40, displays 20, display elements on a weather radar display, display elements on a terrain display, audio alerting devices 30, etc.) configured to warn the pilot of potentially threatening terrain features.

Figure 3:
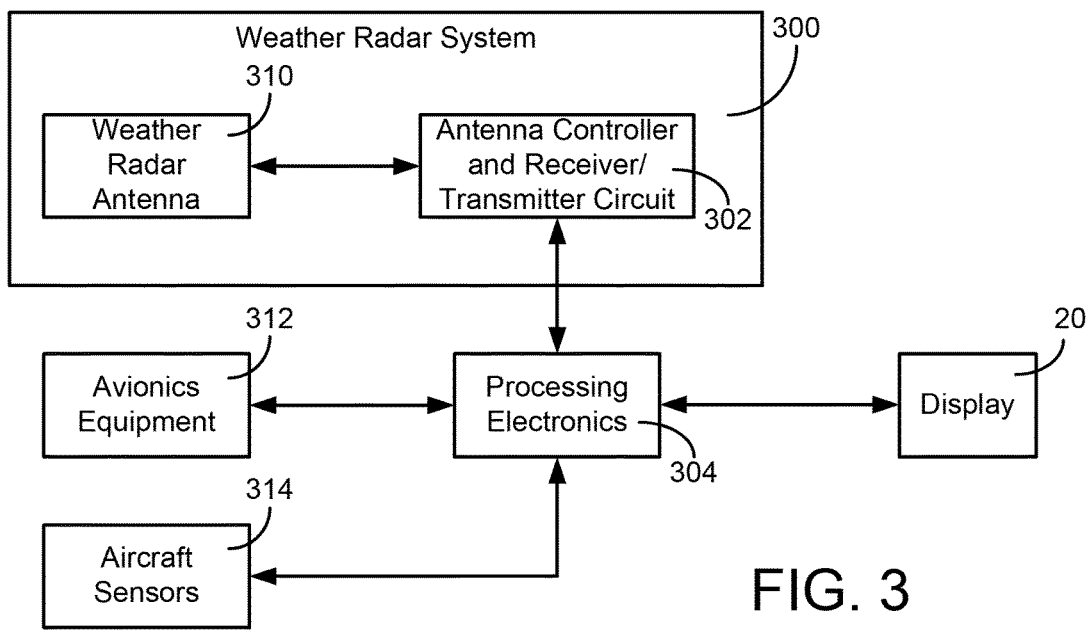
FIG. 3 is a block diagram of a weather radar system, according to an exemplary embodiment.

Referring to FIG. 3, a block diagram of a weather radar system 300 is shown, according to an exemplary embodiment. Weather radar system 300 is shown to include a weather radar antenna 310 connected (e.g., directly, indirectly) to an antenna controller and receiver/transmitter circuit 302. Antenna controller and receiver/transmitter circuit 302 may include any number of mechanical or electrical circuitry components or modules for steering a radar beam. For example, circuit 302 may be configured to mechanically tilt the antenna in a first direction while mechanically rotating the antenna in a second direction. In other embodiments, a radar beam may be electronically swept along a first axis and mechanically swept along a second axis. In yet other embodiments, the radar beam may be entirely electronically steered (e.g., by electronically adjusting the phase of signals provided from adjacent antenna apertures, etc.). Circuit 302 may be configured to conduct the actual signal generation that results in a radar beam being provided from weather radar antenna 310 and to conduct the reception of returns received at radar antenna 310. Radar return data is provided from circuit 302 to processing electronics 304 for processing. For example, processing electronics 304 can be configured to interpret the returns for display on display 20.

Processing electronics 304 can also be configured to provide control signals or control logic to circuit 302. For example, depending on pilot or situational inputs, processing electronics 304 may be configured to cause circuit 302 to change behavior or radar beam patterns. In other words, processing electronics 304 may include the processing logic for operating weather radar system 300. It should be noted that processing electronics 304 may be integrated into radar system 300 or located remotely from radar system 300, for example, in aircraft control center 10.

Processing electronics 304 are further shown as connected to aircraft sensors 314 which may generally include any number of sensors configured to provide data to processing electronics 304. For example, sensors 314 could include temperature sensors, humidity sensors, infrared sensors, altitude sensors, a gyroscope, a global positioning system (GPS), or any other aircraft-mounted sensors that may be used to provide data to processing electronics 304. It should be appreciated that sensors 314 (or any other component shown connected to processing electronics 304) may be indirectly or directly connected to processing electronics 304. Processing electronics 304 are further shown as connected to avionics equipment 312. Avionics equipment 312 may be or include a flight management system, a navigation system, a backup navigation system, or another aircraft system configured to provide inputs to processing electronics 304.

Figure 4:
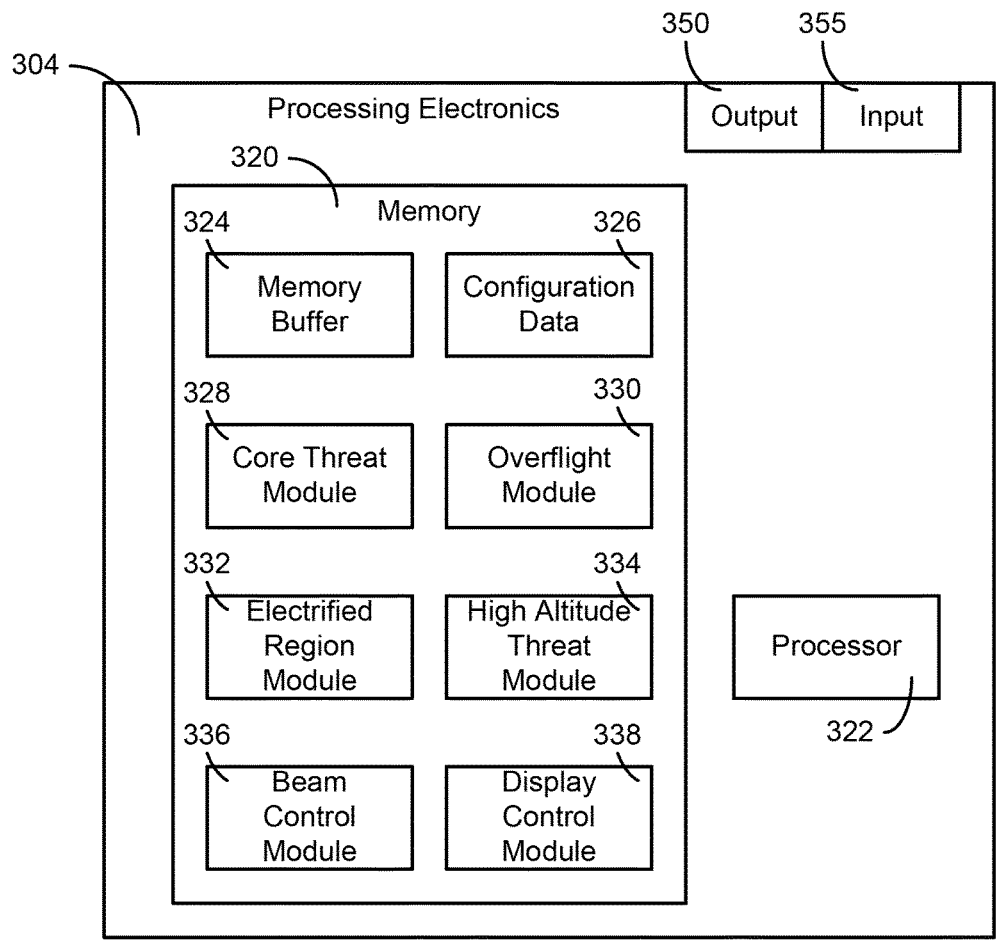
FIG. 4 is a block diagram of the processing electronics of the weather radar system of FIG. 3, according to an exemplary embodiment.

Referring to FIG. 4, a detailed block diagram of processing electronics 304 of FIG. 3 is shown, according to an exemplary embodiment. Processing electronics 304 includes a memory 320 and processor 322. Processor 322 may be or include one or more microprocessors, an application specific integrated circuit (ASIC), a circuit containing one or more processing components, a group of distributed processing components, circuitry for supporting a microprocessor, or other hardware configured for processing. According to an exemplary embodiment, processor 322 is configured to execute computer code stored in memory 320 to complete and facilitate the activities described herein. Memory 320 can be any volatile or non-volatile memory device capable of storing data or computer code relating to the activities described herein. For example, memory 320 is shown to include modules 328-338 which are computer code modules (e.g., executable code, object code, source code, script code, machine code, etc.) configured for execution by processor 322. When executed by processor 322, processing electronics 304 is configured to complete the activities described herein. Processing electronics 304 includes hardware circuitry for supporting the execution of the computer code of modules 328-338. For example, processing electronics 304 includes hardware interfaces (e.g., output 350) for communicating control signals (e.g., analog, digital) from processing electronics 304 to circuit 302 or to display 20. Processing electronics 304 may also include an input 355 for receiving, for example, radar return data from circuit 302, feedback signals from circuit 302 or for receiving data or signals from other systems or devices.

Memory 320 includes a memory buffer 324 for receiving radar return data. The radar return data may be stored in memory buffer 324 until buffer 324 is accessed for data. For example, a core threat module 328, overflight module 330, electrified region module 332, high altitude threat module 334, display control module 338, or another process that utilizes radar return data may access buffer 324. The radar return data stored in memory 320 may be stored according to a variety of schemes or formats. For example, the radar return data may be stored in an x,y or x,y,z format, a heading-up format, a north-up format, a latitude-longitude format, or any other suitable format for storing spatial-relative information.

Memory 320 further includes configuration data 326. Configuration data 326 includes data relating to weather radar system 300. For example, configuration data 326 may include beam pattern data which may be data that a beam control module 336 can interpret to determine how to command circuit 302 to sweep a radar beam. For example, configuration data 326 may include information regarding maximum and minimum azimuth angles of horizontal radar beam sweeps, azimuth angles at which to conduct vertical radar beam sweeps, timing information, speed of movement information, and the like. Configuration data 326 may also include data, such as threshold values, model information, look up tables, and the like used by modules 328-338 to identify and assess threats to aircraft 101.

Memory 320 is further shown to include a core threat module 328 which includes logic for using radar returns in memory buffer 324 to make one or more determinations or inferences relating to core threats to aircraft 101. For example, core threat module 328 may use temperature and radar return values at various altitudes to calculate a probability that lightning, hail, and/or strong vertical shearing exists within a weather cell. Core threat module 328 may be configured to compare the probability and/or severity of the core threat to a threshold value stored, for example, in core threat module 328 or configuration data 326. Core threat module 328 may further be configured to output a signal to display control module 338 indicative of the probability of the core threat, of the inferred threat level within the weather cell, or of the inferred threat level within the weather cell being greater than the measured threat due to radar returns from rainfall. The signal may further cause a change in a color on aviation display 20 associated to the threat level to aircraft 101.

Memory 320 is further shown to include an overflight module 330 which includes logic for using radar returns in memory buffer 324 to make one or more determinations or inferences based on weather below aircraft 101. For example, overflight module 330 may be configured to determine the growth rate of a weather cell and/or the change in altitude of an echo top of a weather cell over time. Overflight module 330 may further be configured to calculate a probability that a weather cell will grow into the flight path of aircraft 101. Overflight module 330 may be configured to output a signal to display control module 338 indicating the threat of the growing weather cell in relation to the flight path of aircraft 101. For example, the signal may indicate predicted intersection of the flight path of aircraft 101 and the weather cell, rate of growth of the weather cell, or predicted growth of the weather cell to within a threshold distance of the flightpath of aircraft 101. For example, the signal may cause an icon to be displayed on aviation display 20 in a location corresponding to the growing cell, wherein the size of the icon may represent the size, amount, or probability of threat to the aircraft. Overflight module 330 may be configured to inhibit display of weather far below, and thus not a threat to, aircraft 101.

Memory 320 is further shown to include a electrified region module 332 which includes logic for using radar returns in memory buffer 324 to make one or more determinations or inferences regarding potentially electrified regions around the weather cell. For example, electrified region module 332 may be configured to use temperature and reflectivity to determine whether a region around a weather cell is likely to produce lightning. Electrified region module 332 may be configured to determine a probability of aircraft 101 producing a lightning strike if the aircraft flies through a particular region based on the reflectivity around a convective cell near the freezing layer. Electrified region module 332 may further be configured to cause a pattern to be displayed on aviation display 20. For example, electrified region module 332 may be configured to output a signal to display control module 338 indicating the existence, location, and/or severity of risk of the electrified region.

Memory 320 is further shown to include a high altitude threat module 334 which includes logic for using radar returns in memory buffer 324 to make one or more determinations or inferences regarding threats related to a blow off or anvil region of a weather cell. For example, high altitude threat module 334 may be configured to use wind speed, wind direction, and size of a weather cell to predict the presence of an anvil region downwind of a weather cell that may contain lightning, hail, and/or turbulence. High altitude threat module 334 may be configured to cause a pattern to be displayed on an aviation display 20. For example, high altitude threat module 334 may be configured to output a signal to display control module 338 indicating the existence, location, and severity or risk of the anvil region.

Memory 320 is further shown to include a beam control module 336. Beam control module 336 may be an algorithm for commanding circuit 302 to sweep a radar beam. Beam control module 336 may be used, for example, to send one or more analog or digital control signals to circuit 302. The control signals may be, for example, an instruction to move the antenna mechanically, an instruction to conduct an electronic beam sweep in a certain way, an instruction to move the radar beam to the left by five degrees, etc. Beam control module 336 may be configured to control timing of the beam sweeps or movements relative to aircraft speed, flight path information, transmission or reception characteristics from weather radar system 300 or otherwise. Beam control module 336 may receive data from configuration data 326 for configuring the movement of the radar beam.

Memory 320 is further shown to include a display control module 338 which includes logic for displaying weather information on aviation display 20. For example, display control module 338 may be configured to display radar return information received from memory buffer 324 and to determine a gain level or other display setting for display of an inferred threat to aircraft 101 on a weather radar display. Display control module 338 may be configured to receive signals relating to threats to aircraft 101 from core threat module 328, overflight module 330, electrified region module 332, and high altitude threat module 334. Display control module 338 may further be configured to cause, in response to one or more signals received from threat modules 328-334 and threshold values from configuration data 326, a change in color of a portion of an image on aviation display 20, a pattern to be overlaid on an image on aviation display 20, and an icon to be shown on aviation display 20. Display control module 338 may be configured to cause a change in size, location, shape, or color of the colored regions, patterns, and/or icons in response to updated signals received from modules 328-336.

Processing electronics 304 may be configured to use none, some, or all of the threat modules 328-334 described above. For example, processing electronics 304 may have an automatic mode, in which weather radar antenna 310 is automatically controlled (e.g., direction, gain, etc.) and core threat module 328, overflight module 330, electrified region module 332, and high altitude threat module 334 are all processing information looking for inferred threats. Processing electronics 304 may have a manual mode, in which one or more of core threat module 328, overflight module 330, electrified region module 332, and high altitude threat module 334 may be disabled, for example, for diagnostic purposes.

Figure 5A:
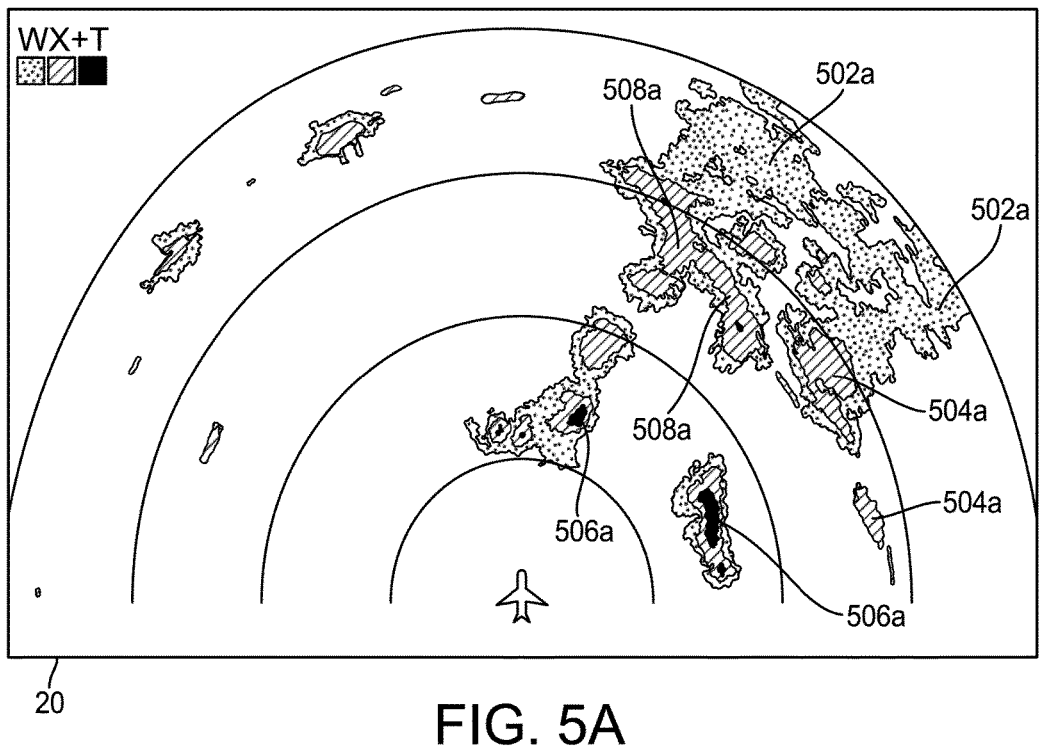
FIGS. 5A and 5B are schematic illustrations of an aviation display showing unmodified and modified radar returns, respectively, in response to an inferred core threat assessment, according to an exemplary embodiment.
Figure 5B:
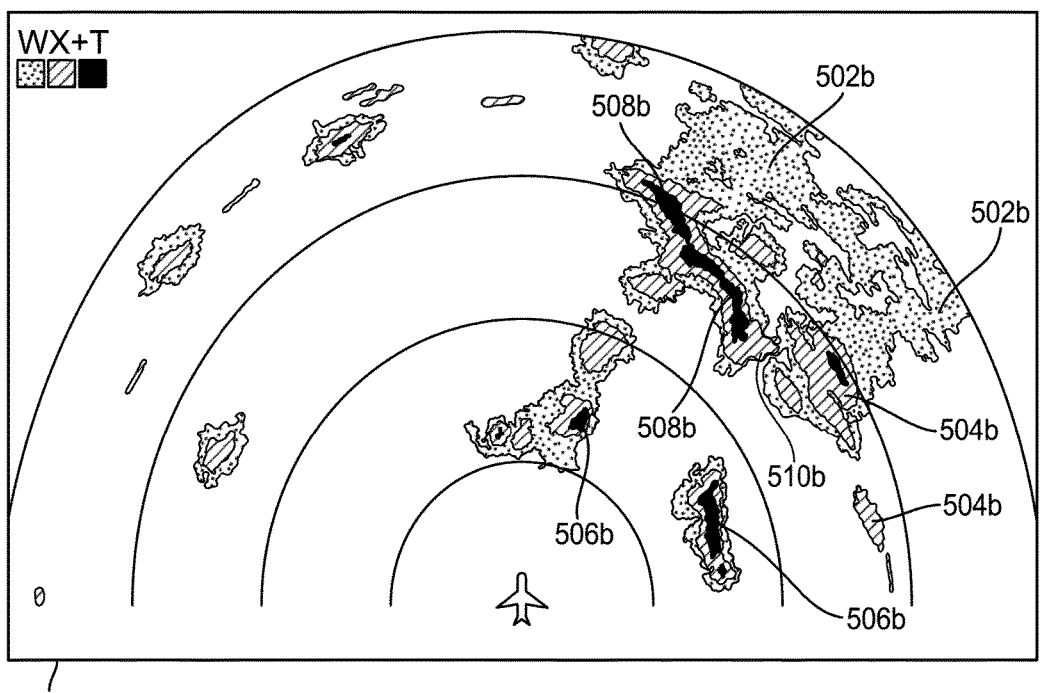

Referring now to FIGS. 5A and 5B, schematic illustrations of aviation display 20 showing unmodified and modified radar returns, respectively, in response to an inferred core threat assessment are shown, according to an exemplary embodiment. Processing electronics 304 may be configured to cause aviation display 20 to show measured threats to aircraft 101. For example, in FIG. 5A, light rain is shown as stippled regions 502a, which is often indicated with a green color. Regions 504a (shown as cross-hatched) indicate moderate rain, and are usually colored yellow to indicate caution to the crew. Regions 506a (shown as solid black) indicate heavy rain, and are usually colored red to indicate warning to the crew. Generally, a crew will always fly through green regions 502, always avoid red regions 506, and use their best judgment on yellow regions 504. In the example shown, a crew heading northeast may decide to bank right and fly through regions 508a rather than climbing or banking left to avoid the weather cell directly in front of aircraft 101.

As described above, processing electronics 304 uses avionics and radar return information to infer a core threat. For example, high reflectivity above the freezing layer indicates a high probability of strong vertical shearing in the middle of the weather cell, which in turn indicates a high probability of hail and/or lightning. According to one embodiment, core threat module 328 may provide a core threat probability to display control module 338, which would be configured to interpret the probability signal and adjust the color of the image displayed on aviation display 20 accordingly. According to another embodiment, core threat module 328 may compare the probability of the core threat to a threshold value and provide a threat level signal to display control module 338. Display control module 338 may then adjust the color shown on aviation display 20 to represent the threat to the aircraft. For example, referring to FIG. 5B, the core threat levels in regions 502b do not exceed the moderate or yellow threshold; thus regions 502b remain colored green. Similarly, the core threat levels in regions 504b do not exceed the high or red threshold and, therefore, remain colored yellow. Regions 506b are already at the highest threat level, so the regions 506b remain red. Referring to regions 508b, processing electronics 304 has inferred a core threat level greater than the high or red threshold. Accordingly, processing electronics 304 has caused the color of regions 508b to change from yellow to red. Similarly, processing electronics 304 has inferred the core threat in region 510b to be a moderate threat and, thus, caused the region 510b to change from no threat indication to yellow. Armed with this inferred core threat information, a crew heading northeast will likely not pass through regions 508b or 510b, instead climbing over the cells or banking left to go around the cells.

In the example above, the image of an increased threat was displayed in response to a determination that the inferred weather threat was greater than the measured weather threat to the aircraft. It is contemplated, however, that an inference of a lower core threat may cause the color level to be reduced. For example, regions 506a indicate heavy rainfall, which is in and of itself not a threat to aircraft 101. If the core threat inference in region 506a is low, region 506b may be reduced to a moderate or yellow threat level. It is further contemplated that regions 508b of inferred core threat may be displayed as a pattern (e.g., striped pattern, speckled pattern, checkerboard pattern, etc.) of the increased threat level color in order to indicate to the crew that the increased threat level is an inference.

Figure 6A:
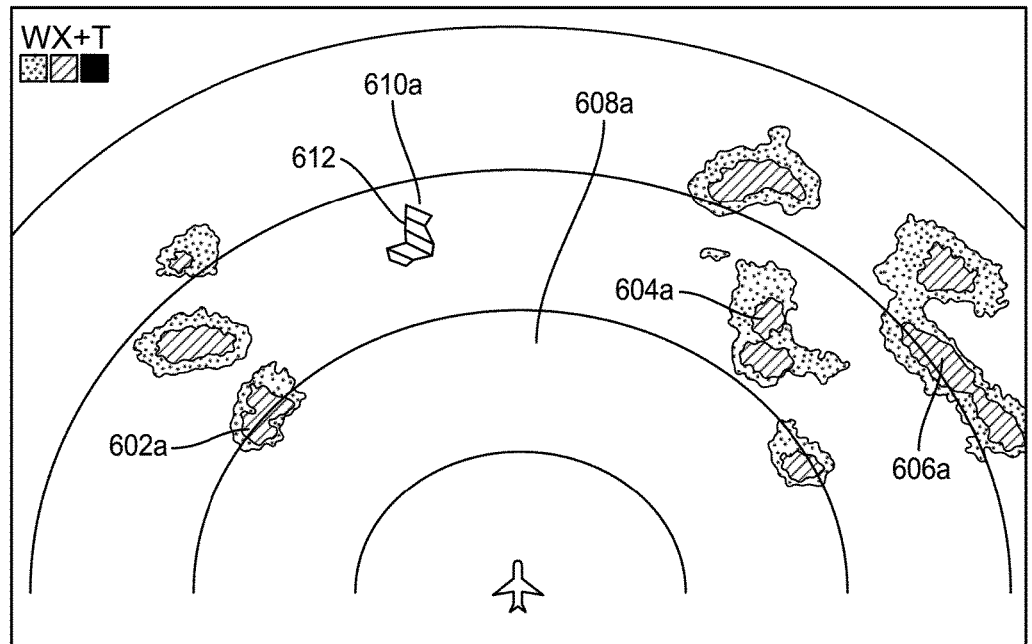
FIGS. 6A and 6B are schematic illustrations of an aviation display showing an inferred overflight threat assessment and a corresponding view from the aircraft control center, respectively, according to an exemplary embodiment.
Figure 6B:
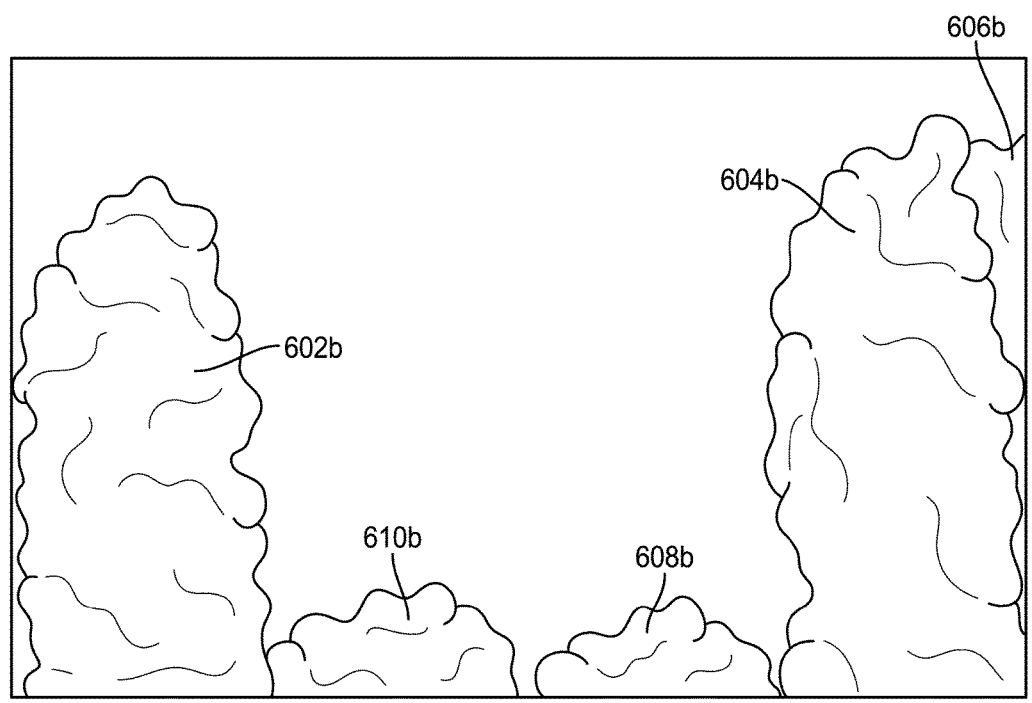

Referring FIGS. 6A and 6B, schematic illustrations of aviation display 20, showing an inferred overflight threat assessment and a corresponding forward view through the windshield of aircraft 101 from aircraft control center 10, respectively, are shown according to an exemplary embodiment. As shown, processing electronics 304 cause aviation display 20 to display radar returns reflecting off the of the moisture within the weather cells. For example, region 602a on display 20 corresponds to a weather cell or cloud 602b seen to the left of FIG. 6B. Similarly, regions 604a and 606a correspond to weather cells or clouds 604b and 606b, respectively. Cloud 608b is far below the flight path of the aircraft, and while the current weather within the cells may be severe, it will not effect aircraft 101 (e.g., not be significant to aircraft operations) as the aircraft overflies weather cell 608b. Thus, processing electronics 304 inhibits display of the weather cell in region 608a of aviation display 20 to prevent the crew from unnecessarily flying around weather cell 608b. However, these lower convective cells are often below, and thus obscured, by a stratiform cloud layer (e.g., cloud deck), making it difficult, if not impossible for the crew to see these developing cells. Accordingly, the current weather conditions of weather cell 610b cause processing electronics 304 to inhibit the display of weather in region 610a of display 20, an icon 612 may be displayed in region 610a to indicate that processing electronics 304 has inferred that weather cell 610b poses a potential hazard to aircraft 101.

Processing electronics 304 may be configured to analyze the growth rate (e.g., the vertical height increase) of a weather cell below aircraft 101. The growth rate may be determined from changes in the altitude of the echo top of weather cell 610b over time. A probability that weather cell 610b will grow into the flight path of the aircraft may be calculated by overflight module 330 and compared to a threshold value. As shown in FIG. 6A, icon 612 is overlaid on the image of measured weather on aviation display 20, the size of icon 612 being indicative of the size of threat to aircraft 101. The size of threat may be a function of the probability that the weather cell will grow into flight path, how close the weather cell is predicted to be to the flight path, the growth rate of the cell, and/or the severity of weather within the cell.

According to another embodiment, the growth rate of a weather cell may not be great enough to grow into the flight path of aircraft 101 while cruising. However, as aircraft 101 begins to descend or turn, its flight path may intersect (or nearly intersect) the predicted location of lower developing activity. Accordingly, processing electronics 304 may consider not only the "straight line" flight path of aircraft 101, but the projected flight path of aircraft 101 according to its flight plan or auto-pilot settings. Processing electronics 304 may also cause icon 612 to be displayed for quickly developing severe cells outside of the flight path of aircraft 101, thereby alerting the crew to the presence of these developing cells before they appear as weather on aviation display 20. For example, a series of icons 612 may indicate to the crew that a larger weather system may be developing.

According to an exemplary embodiment, icon 612 is a yellow cautionary icon, which is displayed over black (e.g., no measured weather, weather far below, etc.) regions of the weather image on aviation display 20. Icon 612 may also be displayed on green (light rain, low threat) regions to indicate that the weather cell is rapidly growing and may worsen. According to other embodiments, icon 612 may be a pattern (e.g., striped pattern, speckled pattern, checkerboard pattern, etc.), wherein the pattern may be oriented to indicate a rate or direction of cell growth.

Figure 7:
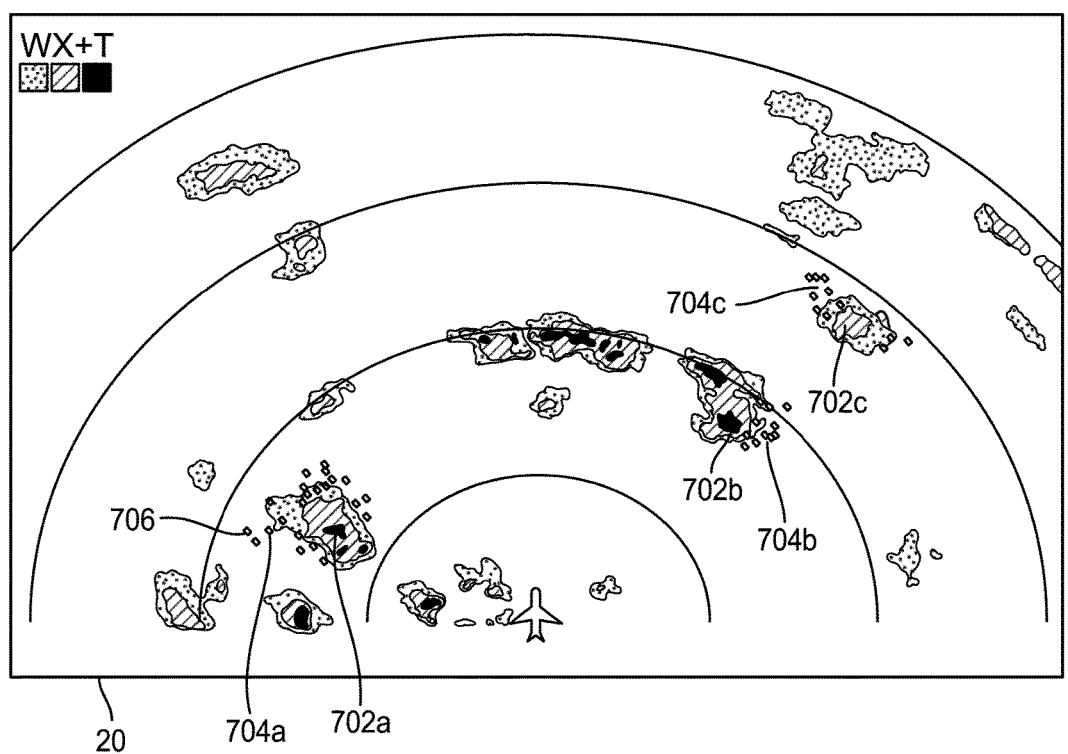
FIG. 7 is a schematic illustration of an aviation display showing an inferred electrified region around a weather cell, according to an exemplary embodiment.

Referring to FIG. 7, a schematic illustration of aviation display 20 showing inferred electrified regions 704 (e.g., electrified regions 704a, 704b, 704c) around a plurality of weather cells (e.g., weather cell 702a, 702b, or 702c) is shown, according to an exemplary embodiment. Processing electronics 304 may be configured to cause images corresponding to the measured rainfall in weather cells 702 and images corresponding to lightning strikes measured with a lightning detector to be displayed on aviation display 20. However, convectivity may generate regions 704 of high electrical potential around weather cells 702, which do not actively produce lightning and, thus, are not measured or displayed as lightning on aviation display 20. As aircraft 101 becomes charged while flying, passage of aircraft 101 through the high voltage region 704 around weather cell 702 may induce a lightning strike through aircraft 101.

Processing electronics 304 may be configured to determine or infer these electrified regions 704 based on reflectivity and the temperature at which the reflectivity is occurring. For example, electrified region module 332 may infer an electrified region based on a reflective region around a convective cell near the freezing layer. Further, electrified regions 704 typically occur at relatively low altitudes (e.g., 10,000 to 25,000 feet), so processing electronics may be configured to further infer electrified regions 704 based on altitude.

In response to an inference of an electrified field, processing electronics 304 may cause a pattern 706 (e.g., speckled pattern, striped pattern, checkerboard pattern, etc.), shown as a speckled pattern, to be overlaid on the image of measured weather on aviation display 20. The size and shape of the pattern 706 may change in response to a change in a level of inferred weather threat to aircraft 101. For example, the shape of the speckled pattern 706 may change with updated radar information.

According to an exemplary embodiment, pattern 706 is yellow to indicate an elevated cautionary threat level. Since electrified regions 704 are typically around the weather cell 702, the yellow pattern 706 is typically displayed over a black region (e.g., no measured weather, very light weather). Yellow pattern 706 may also be displayed over a green region (e.g., light rain, low measured threat) to indicated the elevated inferred threat level. Pattern 706 may be displayed over a yellow region (e.g., moderate rain, medium measured threat level) or a red region (e.g., heavy rain, high measured threat level); however, according to an exemplary embodiment, processing electronics 304 may inhibit pattern 706 from being displayed on yellow or red regions because colors already indicate an equal or higher level of threat. It is contemplated that a red pattern may be displayed over a yellow region in order to indicate an a high probability or intensity of an electrified region in a region of moderate rainfall.

Figure 8A:
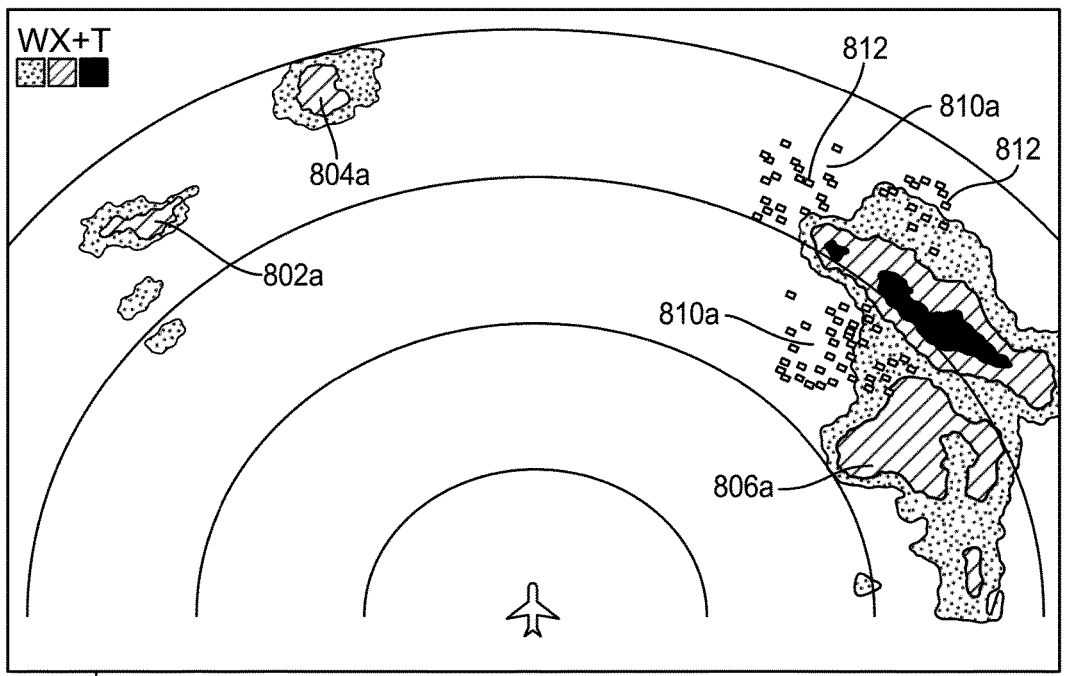
FIGS. 8A and 8B are schematic illustrations of an aviation display showing an inferred high altitude threat and a corresponding view from the aircraft control center, respectively, according to an exemplary embodiment.
Figure 8B:
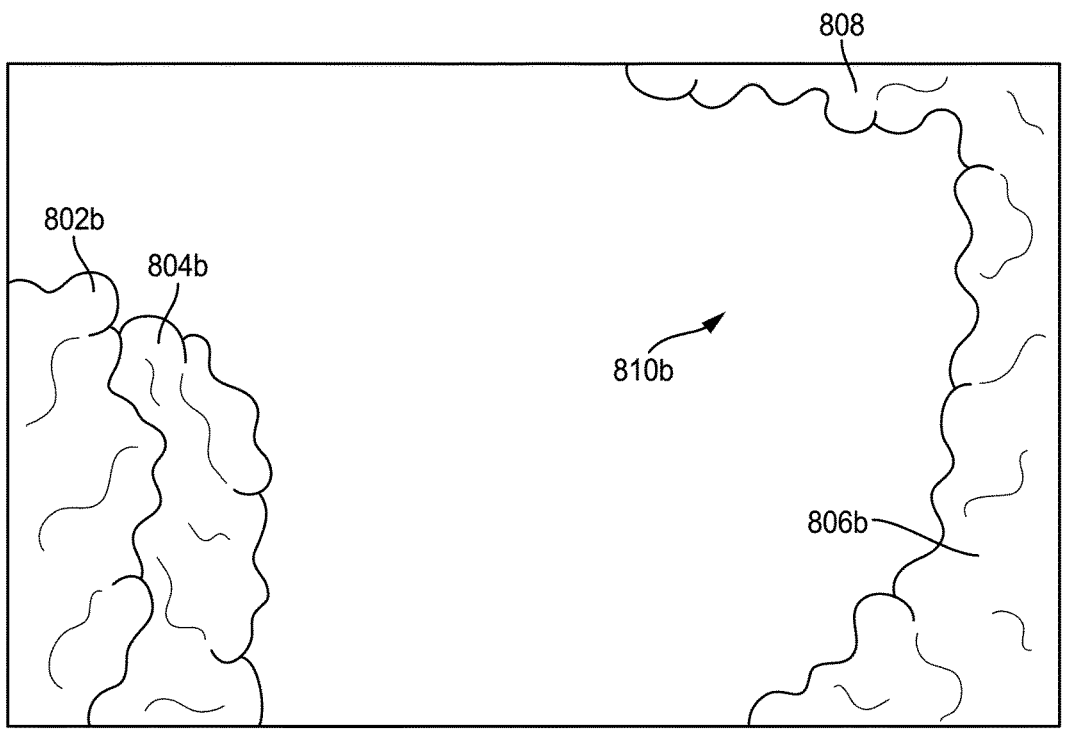

Referring to FIGS. 8A and 8B, schematic illustrations of aviation display 20 showing an inferred high altitude threat and a corresponding forward view through the windshield of aircraft 101 from aircraft control center 10, respectively, are shown according to an exemplary embodiment. Regions 802a, 804a, and 806a shown on aviation display 20 correspond to weather cells or clouds 802b, 804b, and 806b, respectively. Weather cell 806b is shown to include an anvil 808, which is formed when a cumulonimbus cell has reached the level of stratospheric stability. Anvil 808 spreads downwind of the core of weather cell 806b and is associated with a variety of threats including turbulence, lightning, and hail lofted out of the top of the cell. These associated threats, as well as anvil 808 itself, tend to have low reflectivity and, therefore, are not displayed as measured weather on aviation display 20. Furthermore, anvil 808 may be on the opposite side of weather cell 806b from aircraft 101 or may be high above aircraft 101 such that the crew can not easily see the size and location of anvil 808.

Figure 8C:
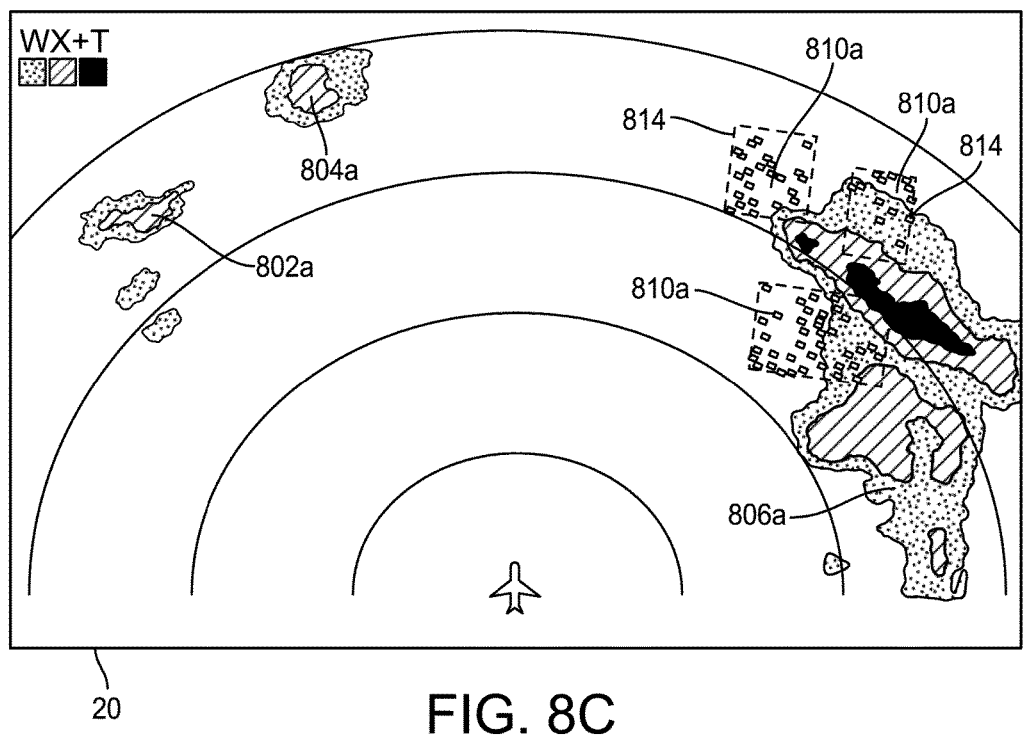
FIG. 8C is a schematic illustration of an aviation display showing an inferred high altitude threat, according to another embodiment.

Processing electronics 304 may be configured to determine or infer associated threat regions 810a associated with anvil 808 based on wind speed, wind direction, and the size of the cell. For example, high altitude threat module 330 may infer an associated threat regions 810a on a downwind side of high altitude, high convectivity cell. In response to an inference of an associated threat region 810a, processing electronics 304 may cause a pattern 812 (e.g., speckled pattern, striped pattern, checkerboard pattern, etc.), shown as a speckled pattern, to be overlaid on the image of measured weather on aviation display 20. The size and shape of the pattern 812 may change in response to a change in a level of inferred weather threat to aircraft 101. For example, the shape of the speckled pattern 706 may change with updated radar information. According to one embodiment, the stripes of pattern 812 are oriented in the direction of the wind. According to another embodiment, shown in FIG. 8C, processing electronics 304 may cause boxes 814 to be displayed around associated threat regions 810.

As described above with respect to pattern 706, pattern 812 may be yellow to indicate an elevated cautionary threat level. According to an exemplary embodiment, pattern 812 may be displayed or black (e.g., no measured weather, very light weather) or green (e.g., light rain, low measured threat) regions to indicate the elevated inferred threat level; however, pattern 812 may not be displayed over a yellow (e.g., moderate rain, medium measured threat level) or a red (e.g., heavy rain, high measured threat level) region as these regions already indicate an equal or higher level of threat.

Figure 9:
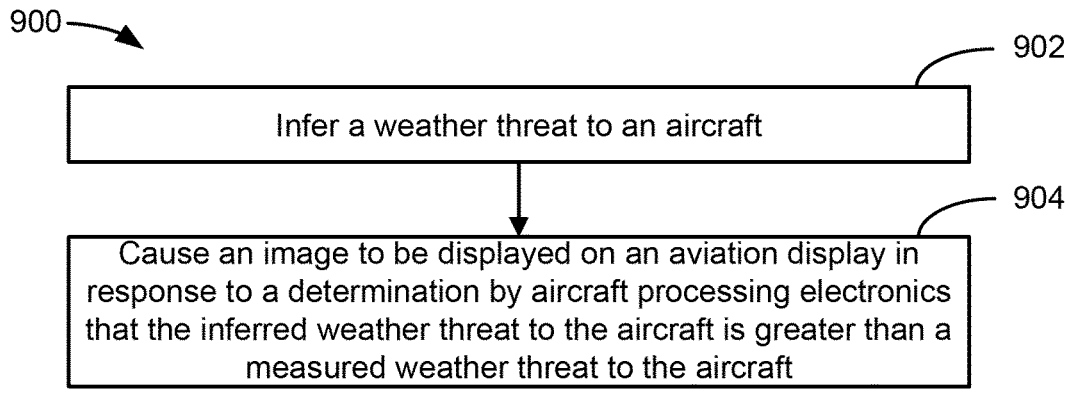
FIG. 9 is a flowchart of a process for indicating a weather threat to an aircraft, according to an exemplary embodiment.

Referring to FIG. 9, a flowchart of a process 900 for indicating a weather threat to an aircraft 101 is shown, according to an exemplary embodiment. Process 900 is shown to include the steps of inferring a weather threat to an aircraft 101 (step 902) and causing an image to be displayed on an aviation display in response to a determination by aircraft processing electronics that the inferred weather threat to the aircraft is greater than a measured weather threat to the aircraft (step 904).

Figure 10:
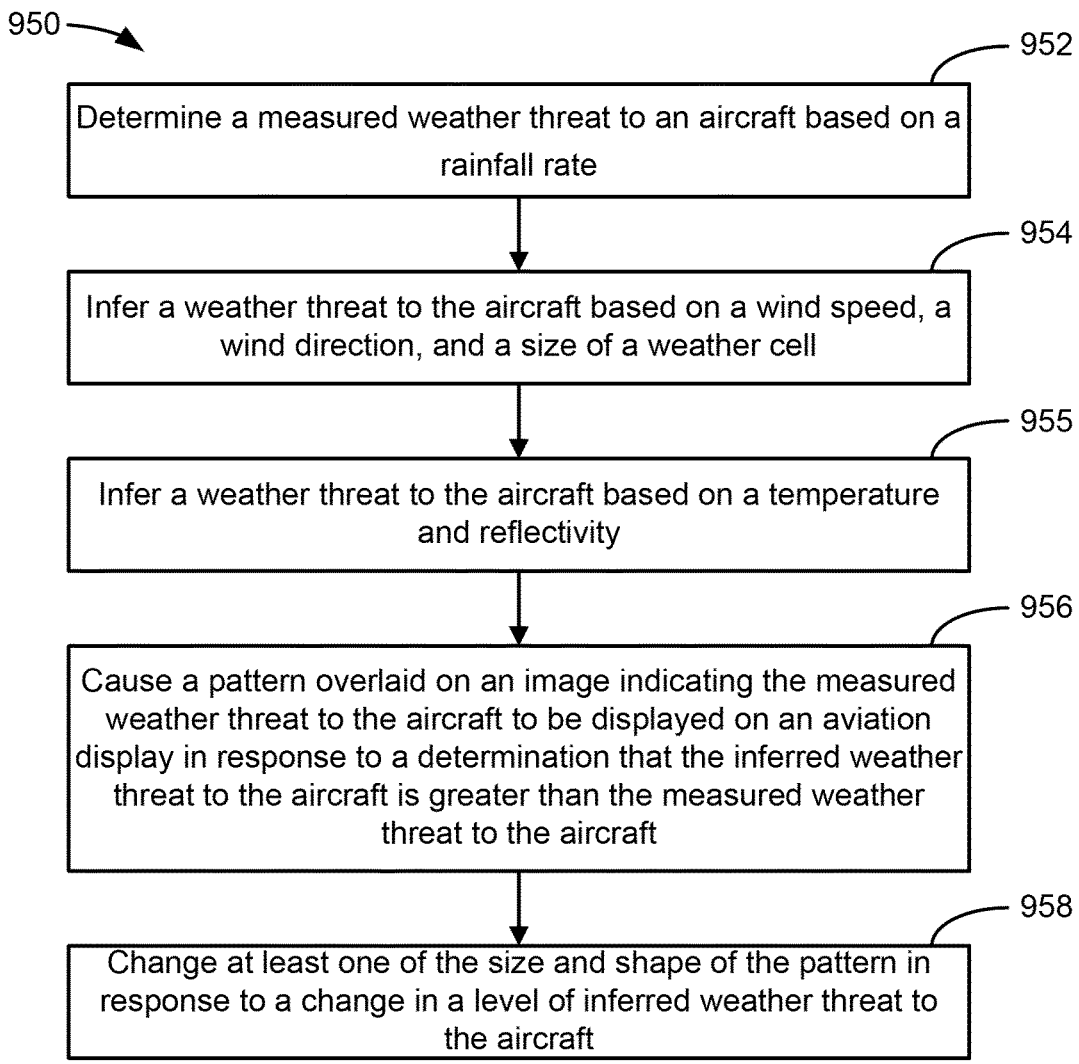
FIG. 10 is a flowchart of a process for indicating a weather threat to an aircraft, according to another embodiment.

Referring to FIG. 10, a flowchart of a process 950 for indicating a weather threat to an aircraft is shown, according to another embodiment. Process 950 is shown to include the steps of determining a measured weather threat to an aircraft based on a rainfall rate (step 952), inferring a weather threat to aircraft 101 based on a wind speed, a wind direction, and a size of a weather cell (step 954), and inferring a weather threat to aircraft 101 based on a temperature and reflectivity (step 955). Process 950 is further shown to include the step of causing, in response to a determination that the inferred weather threat to aircraft 101 is greater than the measured weather threat to aircraft 101, a pattern overlaid on an image indicating the measured weather threat to the aircraft to be displayed on aviation display 20 (step 956). The size and/or the shape of the pattern may be changed in response to a change in a level of inferred threat to aircraft 101 (step 958).

Various alternate embodiments of process 950 are contemplated. Process 950 may not include all of the steps shown. For example, process 950 may not include only one of the steps of inferring a weather threat to aircraft 101 based on a wind speed, a wind direction, and a size of a weather cell (step 954) or inferring a weather threat to aircraft 101 based on a temperature and reflectivity (step 955). According to another embodiment, process 950 may not include the step of changing the size or shape of the pattern in response to a change in a level of inferred weather threat to aircraft 101 (step 958). The steps of process 950 may be performed in various orders. For example, determining measured weather threats (step 952) and inferring weather threats (steps 954, 955) may be performed in any order or simultaneously.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps, and decision steps.

What is claimed is:

1. A method, comprising:
determining a first threat level associated with a threat posed to an aircraft by a weather characteristic based on radar return data;
detecting a weather threat to the aircraft;
determining a second threat level posed to the aircraft by the weather threat; and
causing a pattern to be overlaid on an image of the weather characteristic displayed on an aviation display, wherein the pattern is overlaid on a location of the aviation display corresponding to the location of the weather characteristic in response to determining that the second threat level is greater than the first threat level.

2. The method of claim 1, wherein the pattern comprises a speckled pattern allowing an underlying color of the weather characteristic to show through between the speckles.

3. The method of claim 1, further comprising detecting the weather threat to the aircraft based on at least one of a wind speed, a wind direction, and a size of a weather cell, and wherein the weather threat comprises a blow off region.

4. The method of claim 3, wherein the weather threat to the aircraft is located in a region downwind of the weather cell, and wherein the weather cell is capable of producing at least one of hail, lightning, and turbulence.

5. The method of claim 1, further comprising detecting the weather threat to the aircraft based on a temperature and reflectivity, wherein the weather threat comprises an electrified region capable of producing a lightning strike.

6. The method of claim 5, wherein the electrified region is a non-active high voltage region, and wherein the aircraft increases a likelihood of the non-active high voltage region striking.

7. The method of claim 1, further comprising changing at least one of the size and shape of the pattern in response to a change in a level of the detected turbulence threat to the aircraft.

8. The method of claim 1, wherein the weather characteristic is a precipitation rate.

9. An apparatus, comprising:
processing electronics configured to:
determine a first threat level associated with a threat posed to an aircraft by a weather characteristic based on radar return data;
determine a weather threat to the aircraft;
determine a second threat level posed to the aircraft by the weather threat;
cause a portion of an image of the weather characteristic displayed on a display to be adjusted based on the second threat level exceeding the first threat level.

10. The apparatus of claim 9, wherein the processing electronics are configured to cause a color of a portion of the image to be adjusted in response to the probability of at least one of hail, lightning, and turbulence within a weather cell exceeding a threshold.

11. The apparatus of claim 10, wherein adjusting the color of a portion of the image comprises changing the color to a color indicating an increased severity.

12. The apparatus of claim 9, wherein the processing electronics are configured to cause a portion of the image to change color based on temperature and reflectivity as a function of altitude.

13. The apparatus of claim 9, wherein the processing electronics are configured to adjust a color of a portion of the image in response to at least one of an inference of lightning and hail within a weather cell.

14. The apparatus of claim 10, wherein the weather characteristic is a precipitation rate and the weather threat is turbulence.

15. A system, comprising:
a processing circuit configured to:
determine a first threat level associated with a threat posed to an aircraft by a weather characteristic based on radar return data;
determine a weather threat to the aircraft using an algorithm to infer one of a blow off region from an anvil, an electrified region of airspace, an updraft, and whether a weather cell will grow into a path of the aircraft;
determine a second threat level posed to the aircraft by the weather threat; and
cause an icon to be overlaid on an image of the weather characteristic displayed on an aviation display in response to the second threat level exceeding the first threat level.

16. The system of claim 15, wherein the weather cell is at an altitude below the aircraft, and wherein the processing circuit is further configured to determine a growth rate of a weather cell.

17. The system of claim 15, wherein the weather threat to the aircraft is determined based on a probability that a weather cell will grow into the flight path of the aircraft.

18. The system of claim 17, wherein the size of the icon is representative of a size of the weather threat.

19. The system of claim 18, wherein the processing circuit is further configured to adjust the size of the icon based on how close a weather cell is predicted to be to a current or predicted flight path of the aircraft.

20. The system of claim 15, wherein the blow off region from an anvil is inferred from a wind speed, a wind direction, and a size of a weather cell, wherein the electrified region of airspace is inferred from a temperature and a reflectivity, wherein the updraft is inferred from a temperature and a reflectivity as a function of altitude, and wherein whether a weather cell will grow into a path of the aircraft is inferred from a change in an altitude of an echo top of a weather cell over time.

* * * * *